Patented Oct. 28, 1947

2,429,878

UNITED STATES PATENT OFFICE 2,429,878

SYNTHESIS OF GLYCOL ETHERS

William F. Gresham, Lindamere, and Richard E. Brooks, Wilmington, Del., assignors to E. I. du Pont de Nemours & Company, Wilmington, Del., a corporation of Delaware No Drawing. Application May 17, 1946, Serial No. 670,525

6 Claims. (Cl. 260—615)

This invention relates to the synthesis of organic oxygen-containing compounds, and more particularly to the synthesis of glycol ethers, by simultaneous reaction between acetals, carbon monoxide, and hydrogen.

An object of this invention is to provide a method for preparing glycol ethers from relatively inexpensive and readily available starting materials. Other objects of the invention will appear hereinafter.

In copending application S. N. 590,960, filed April 28, 1945, it is disclosed that polyhydroxy compounds can be prepared by reaction between formaldehyde, carbon monoxide and hydrogen in the presence of hydrogenation catalysts, preferably at elevated temperatures under pressures in excess of 100 atmospheres. It is also disclosed in that application that the corresponding reaction takes place when reactive formals are substituted for the formaldehyde reactant. Suitable solvents can be employed, such as aliphatic ethers. This application is a continuation-in-part of the said copending application S. N. 590,960.

It has been discovered in accordance with this invention that organic oxygen-containing compounds, and more particularly glycol ethers, are produced by reaction between acetals, carbon monoxide and hydrogen in the presence of a dialkyl ether and a hydrogenation catalyst.

The hydrogenation catalysts which may be employed in the practice of the invention include such materials as nickel, cobalt, manganese, iron, chromium, copper, platinum, zinc, cadmium, ruthenium, and compounds thereof or a combination of these materials with each other or with inert supports such as charcoal, silica gel, kieselguhr, pumice, etc., or promoters such as $ThO_2$, Mn, etc. The amount of catalyst employed is generally about 0.1% to 20% based on the total weight of reaction mixture, although much smaller quantities of the more active catalyst are found to be effective. Among the best catalysts for use in this invention are cobalt catalysts, such as metallic cobalt, reduced sintered cobalt oxide, cobalt carbonyl, cobalt salts such as cobalt acetate, cobalt propionate, cobalt naphthenate, cobalt chloride and the like.

Any of the dialkyl formals may be employed as reactants in the practice of the invention. Acetals containing aromatic or cycloaliphatic groups, or olefinic linkages, and also such materials as acetals of the formula $CH_3CH(O\ Alkyl)_2$ and $CH_3OCH_2CH_2(O\ Alkyl)_2$, may be used. Excellent results are obtained with the lower dialkyl formals such as methylal, which may be introduced in the form of methanol-methylal azeotrope if desired. Likewise, any of the dialkyl ethers may be employed, the lower dialkyl ethers such as the dimethyl ether being preferred. The initial molal ratio of dialkyl formal:dialkyl ether is not highly critical but should preferably be within the range of about 2:1 to 1:10.

The carbon monoxide employed in the practice of the invention preferably should be relatively pure, although the carbon monoxide obtained by the usual commercial methods may be employed satisfactorily.

The reaction is preferably conducted by heating a mixture of dialkyl formal, dialkyl ether, carbon monoxide and hydrogen in a suitable pressure-resistant vessel in the presence of one of the aforesaid catalysts. In certain embodiments, the initial molal ratio of $CO:H_2$ is preferably within the range of 3:1 to 1:3. In one method of practicing the invention, super-atmospheric pressures are employed, usually pressures of at least 10 atmospheres. Optimum results are obtained at pressures within the range of about 600 to 1000 atmospheres. The maximum pressure is determined by the strength of the retaining vessel and may be as high as 3000 atmospheres or higher. The reaction temperature is usually within the range of 100° to 350° C., preferably about 200° to 250° C.

In a specific embodiment of the invention, methylal and dimethyl ether are placed in a pressure-resistant vessel along with the catalyst, and a mixture of carbon monoxide and hydrogen is thereafter injected under very high pressure. The temperature of the mixture is controlled by suitable devices, and is maintained within the range set forth above. After reaction is complete, the resulting product is removed from the reaction vessel and the glycol methyl ether produced by the reaction is separated from the mixture by any suitable method, such as by fractional distillation. The invention is illustrated further by means of the following example.

*Example.*—A mixture containing 38.1 grams of methylal, 115 grams of dimethyl ether, and 20 grams of reduced sintered cobalt oxide catalyst was placed in a silver-lined shaker tube and an equimolar mixture of carbon monoxide and hydrogen was injected into the tube under a pressure of 600 to 700 atmospheres. This reaction mixture was shaken for 53 minutes at a temperature of 200° to 235° C. with intermittent injections of the carbon monoxide:hydrogen mixture to maintain pressure of at least 600 atmospheres. The resulting reaction mixture was withdrawn from the reaction vessel and also fractionally distilled. Methoxyethanol (B. P. 123–124.5° C.) was obtained in good yield.

The above example is illustrative only and is not intended to limit the invention. While in the example the invention is illustrated by means of a batchwise operation, it is to be understood that the invention may also be practiced in a continuous manner. It is generally preferred to employ catalysts which are either in a finely divided dispersed form, or which are soluble in the reaction mixture; however, a fixed bed of catalyst may be employed if desired. When soluble catalysts are employed, any convenient method for recovery and reuse of the same, e. g., by recycling the residue obtained upon distillation of the reaction product, may be practiced, in accordance with the invention.

The products obtained by the novel process herein disclosed are widely useful as solvents, intermediates for the manufacture of esters, etc.

Since many embodiments of the invention may be made without departing from the spirit and scope thereof, it will be understood that we do not limit ourselves except as set forth in the following claims.

We claim:

1. A process for the synthesis of organic oxygen-containing compounds which comprises reacting simultaneously, in the presence of a hydrogenation catalyst and a dialkyl ether, a dialkyl formal, carbon monoxide and hydrogen, and thereafter removing from the reaction product the organic oxygen-containing compounds produced by the said reaction.

2. A process for the synthesis of glycol ethers which comprises heating a dialkyl formal with carbon monoxide and hydrogen in the presence of a dialkyl ether at a temperature within the range of 100° to 350° C. under a pressure of at least 10 atmospheres in the presence of a hydrogenation catalyst and thereafter separating a glycol alkyl ether from the resultant reaction product.

3. A process for the synthesis of glycol ethers which comprises heating a dialkyl formal with carbon monoxide and hydrogen in the presence of a dialkyl ether at a temperature within the range of 100° to 350° C. under a pressure of 600 to 1000 atmospheres in the presence of a hydrogenation catalyst and thereafter separating a glycol alkyl ether from the resultant reaction product.

4. A process for the synthesis of glycol ethers which comprises heating methylal with carbon monoxide and hydrogen in the presence of dimethyl ether at a temperature within the range of 100° to 350 C. under a pressure of 600 to 1000 atmospheres in the presence of a hydrogenation catalyst and thereafter separating ethylene glycol methyl ether from the resultant reaction product.

5. A process for the synthesis of glycol ethers which comprises heating methylal with carbon monoxide and hydrogen in the presence of dimethyl ether at a temperature within the range of 100° to 350° C. under a pressure of 600 to 1000 atmospheres in the presence of a cobalt catalyst and thereafter separating ethylene glycol methyl ether from the resultant reaction product.

6. The process set forth in claim 5 in which the initial molal ratio of $CO:H_2$ is within the range of 3:1 to 1:3.

WILLIAM F. GRESHAM.
RICHARD E. BROOKS.